United States Defensive Publication [19] (H) [11] T983,008

Lawes [43] Jun. 5, 1979

[54] MIXING PARTICULATE ADDITIVES INTO THERMOPLASTICS POLYMERS

[75] Inventor: Hubert Lawes, Blackpool, England

[73] Assignee: Imperial Chemical Industries Limited, London, England

[21] Appl. No.: 942,828

[22] Filed: Sep. 13, 1978

Related U.S. Application Data

[63] Continuation of Ser. No. 839,570, Oct. 5, 1977, abandoned, which is a continuation-in-part of Ser. No. 652,059, Jan. 26, 1976, abandoned.

[30] Foreign Application Priority Data

Jan. 31, 1975 [GB] United Kingdom ..... 4290/75

[51] Int. Cl.[2] ..... C08K 3/00; C08K 3/04

[52] U.S. Cl. ..... 260/42; 260/37 N; 260/40 R; 260/42.21; 260/45.95 F

[57] ABSTRACT

A method for mixing particulate additives into a thermoplastic polymer which has been made by a process which produces the polymer in a molten state is disclosed including the improvement in combination, of the successive steps: (a) converting the polymer into a solid powder 95% by weight of which is capable of passing through a 2,000 μm sieve, (b) subjecting the powdered polymer and the particulate additive to the mixing action of a rotary blade mixer in which the blades are rotating at a speed sufficient to fluidize the mixture, and thereafter (c) subjecting the mixture produced in the rotary blade mixer to the further mixing action of an internal mixer for at least 1.75 minutes. In this way the mixing cycle of the internal mixer is drastically shortened with no adverse effect on the quality of the blend obtained. The process also permits a wider range of polymers to be mixed in an internal mixer and avoids the generation of steam and consequent loss of additive normally associated with carbon black mixing operations carried out in Banbury mixers. The process is especially suited for adding carbon black to particulate low density polyethylene and copolymer thereof.

3 Claims, No Sheets Drawing,

18 Pages Specification

The file of this unexamined application may be inspected and copies thereof may be purchased (849 O.G. 1221, Apr. 9, 1968).